United States Patent
Rempt et al.

(10) Patent No.: US 8,652,418 B2
(45) Date of Patent: Feb. 18, 2014

(54) PIPETTE FOR A PIPETTE SYSTEM HAVING PIPETTE AND SYRINGE

(75) Inventors: Renate Rempt, Wertheim (DE); Dieter Böhm, Wertheim (DE); Steffen Gehrig, Wallduern (DE); Ottmar Kneucker, Helmstadt (DE)

(73) Assignee: Brand GmbH + Co KG, Wertheim (DE)

( * ) Notice: Subject to any disclaimer, the term of this patent is extended or adjusted under 35 U.S.C. 154(b) by 279 days.

(21) Appl. No.: 13/174,854

(22) Filed: Jul. 1, 2011

(65) Prior Publication Data
US 2012/0003129 A1     Jan. 5, 2012

(30) Foreign Application Priority Data

Jul. 1, 2010 (DE) .................... 20 2010 009 747 U (51) Int. Cl.
    *B01L 3/02* (2006.01)
(52) U.S. Cl.
    USPC ........ 422/501; 422/522; 422/525; 73/864.13; 73/864.16
(58) Field of Classification Search
    USPC ........... 422/501, 509–526; 73/864.01–864.25
    See application file for complete search history.

(56) References Cited

U.S. PATENT DOCUMENTS

| | | | |
|---|---|---|---|
| 4,099,548 A * | 7/1978 | Sturm et al. | 141/27 |
| 4,406,170 A | 9/1983 | Kühn | |
| 5,573,729 A * | 11/1996 | Belgardt et al. | 422/515 |
| 5,620,660 A | 4/1997 | Belgardt et al. | |
| 5,620,661 A * | 4/1997 | Sch urbrock | 422/525 |
| 6,540,964 B2 | 4/2003 | Kohrmann et al. | |
| 7,563,409 B2 | 7/2009 | Suovaniemi et al. | |
| 7,731,908 B2 | 6/2010 | Lenz | |
| 2009/0139351 A1 | 6/2009 | Reichmuth et al. | |
| 2011/0072915 A1* | 3/2011 | Molitor et al. | 73/864.11 |

FOREIGN PATENT DOCUMENTS

DE     199 17 907 A1     11/2000

OTHER PUBLICATIONS

GK800 General Catalogue, Handystep® Multi-Dispenser by Brand GMBH+CO KG, Wertheim From p. 61, Discussed on p. 2 of the Present Specification.

* cited by examiner

*Primary Examiner* — Jan Ludlow
(74) *Attorney, Agent, or Firm* — Roberts Mlotkowski Safran & Cole, P.C.; David S. Safran (57) ABSTRACT

A pipette for a pipette system comprising a pipette and a syringe. The pipette housing has a longitudinal axis. A syringe to be handled with the pipette is insertable with its fastening portion and plunger head into the pipette housing and is removable or discardable from said pipette housing in the direction of the longitudinal axis of the pipette housing, i.e., axially. The syringe has as cylinder and a plunger with a plunger head which projects out of the end of the cylinder even when the plunger has been completely inserted into the cylinder. A pipette housing comprises an axially accessible plunger gripping device for the plunger head of the syringe. An actuating device for the plunger gripping device is mounted on the plunger displacing device and is axially displaceable with said adjusting device.

20 Claims, 8 Drawing Sheets

Fig. 1

PIPETTE FOR A PIPETTE SYSTEM HAVING PIPETTE AND SYRINGE

BACKGROUND OF THE INVENTION

1. Field of the Invention

The invention relates to a pipette for a pipette system having a pipette and a syringe.

2. Description of Related Art

The known pipette, from which the invention proceeds (German Patent Application DE 199 17 907 A1), is particularly suitable with regard to handling within a pipette system because the replaceable syringe to be handled in each case with the pipette is insertable into the pipette and is removable again or discardable from said pipette in an axial manner. In a pure axial movement, the respective syringe is therefore directly insertable into the pipette as far as into the gripping positions of the flange of the cylinder and the plunger head of the plunger. The fixing in the gripping position is effected by means of radially adjustable cylinder gripping levers of the cylinder gripping device on the fastening portion of the cylinder, i.e., the flange thereof, and by means of radially adjustable plunger gripping levers of the plunger gripping device on the axially adjustable plunger adjusting device.

On account of the axial relative movement between the pipette and the syringe, the syringe can be held for picking-up in a fixed position anywhere, for example, in a stand. The pipette only has to be moved axially in relation to the syringe for the picking-up operation. To discard the syringe, it is also not necessary to grasp the syringe, it can simply fall out of the pipette axially or be discarded axially from the pipette. In this case the syringe is not touched, which means that the pipetted liquid cannot be contaminated by the hand.

In the case of the known pipette, addressed beforehand, two cylinder gripping levers and plunger gripping levers each are provided, the levers being located opposite each other, being under spring force in the gripping position and being movable into the release position in opposition to the spring force. An actuating device serves for actuating both pairs of levers, the actuating device having a central actuating element on the pipette housing which is actuatable from the outside.

In the case of the design outlined beforehand, the synchronization of multiple cylinder gripping levers and plunger gripping levers in the pipette housing is effected automatically by means of the force transmitting drives which proceed from the common, actuating element fixed in a stationary manner on the pipette housing. This is practical from a handling point of view. However, problems arise here, on the one hand, in the structural limitation to an additional, central actuating element which is externally actuatable and is fixed in a stationary manner on the pipette housing, and on the other hand, in the fact that it is not possible to release the cylinder gripping device and the plunger gripping device independently of each other.

In the case of other pipettes that are expedient from a handling point of view and have axial syringe coupling, there are similar problems with the actuation of the plunger gripping device and the cylinder gripping device as well as with the synchronization of the cylinder gripping levers (see, German Patent DE 43 41 229 C2 which corresponds to U.S. Pat. No. 5,620,660; German Patent Application DE 10 2005 023 203 A1 which corresponds to U.S. Pat. No. 7,731,908 B2, and European Patent EP 1 524 035 A1 which corresponds to U.S. Pat. No. 7,563,409 B2).

Along with the pipettes with axial syringe coupling explained beforehand, there are various designs of pipettes with radial syringe coupling (German Patent Application DE 199 63 141 A1 which corresponds to U.S. Pat. No. 6,540,964 B2; DE 29 26 691 A1 corresponds to U.S. Pat. No. 4,406,170; and the "HandyStep®" multi-dispenser by BRAND GMBH+ CO KG, Wertheim from page 61 in the "GK800" general catalogue). The structural solutions proposed there for corresponding plunger gripping devices necessarily presuppose the plunger head being displaced in and out of the syringe by hand in a radially directed manner and are consequently not suitable for pipettes with axial syringe coupling.

SUMMARY OF THE INVENTION

Thus, the invention is directed to improving the aforementioned known pipette with axial syringe coupling with regard to structural and handling design possibilities.

The problems listed beforehand are solved in the case of the pipette according to the invention with the features described below.

The invention is directed to a pipette for a pipette system, comprising a pipette and a syringe, wherein the syringe has a cylinder with a fastening portion realized preferably as a flange, and a plunger with a plunger head which projects out of the end of the cylinder even when the plunger has been completely inserted into the cylinder, a pipette housing which has a longitudinal axis, wherein a syringe to be handled with the pipette is insertable with its fastening portion and plunger head into the pipette housing and is removable or discardable from said pipette housing in the direction of the longitudinal axis of the pipette housing, i.e., axially, an axially accessible opening on the pipette housing for the fastening portion of the syringe, an axially accessible cylinder gripping device, mounted fixed in position in the pipette housing, for the fastening portion of the syringe, having a plunger displacing device which is axially displaceable in the pipette housing, an axially accessible plunger gripping device for the plunger head of the syringe, the plunger gripping device being mounted on the plunger displacing device and being axially displaceable with the plunger adjusting device, and an actuating device for the plunger gripping device, wherein, by actuating the actuating device, the plunger gripping device is movable from a gripping position into a release position, in which the plunger head of a syringe is released for removal or picking up, wherein the actuating device for the plunger gripping device is mounted on the plunger displacing device and is axially displaceable with the plunger adjusting device.

According to the invention, the actuating device for the plunger gripping device is mounted on the axially displaceable plunger displacing device and is axially displaceable in the pipette housing with said plunger adjusting device. This means that there is no requirement for the complicated development of force transmitting trains, to be decoupled in operation in the pipette housing between the actuating element fixed in position on the pipette housing and the plunger gripping device and, where applicable, also the cylinder gripping device. The force transmitting trains are realized on the plunger displacing device and consequently do not have to be separated in operation, that is to say when the plunger displacing device is displaced.

According to a further aspect of the invention the plunger gripping device is also movable out of the release position into the gripping position by actuating the actuating device, wherein the plunger gripping device has a support, which supports the plunger head of a syringe inserted into the pipette housing radially, transversely in relation to the longitudinal axis of the pipette housing, and an adjustable plunger head gripping means, wherein by actuating the actuating device, the plunger head gripping means is adjustable from the release position, releasing the plunger head, into the gripping position, fixing the plunger head on the plunger adjusting device, and wherein by means of the actuating device, the plunger head gripping means is adjustable in relation to the support in an adjustment movement which has at least one considerable radial component and, for this purpose, preferably, is pivotably mounted on the plunger adjusting device.

In this case, by actuating the actuating device, the plunger head gripping means is not only adjustable from the release position, releasing the plunger head, into the gripping position, fixing the plunger head on the plunger adjusting device, but is also movable in the reverse manner back into the release position. This means that it is possible to hold the plunger head in a controlled friction-locked manner and to release it again.

Structural optimization is managed here, in particular, because the plunger gripping device is constructed in a particular manner. The plunger gripping device namely has a support, which supports the plunger head of a syringe inserted into the pipette housing transversely in relation to the longitudinal axis of the pipette housing, i.e., radially, and an adjustable plunger head gripping means, which is adjustable relative to the plunger head between a release position, releasing the plunger head, and a gripping position, fixing the plunger head on the plunger displacing device together with the support. In the gripping position, said plunger head gripping means fixes the plunger head on the plunger displacing device in a non-slip manner in the axial direction. It is also adjustable by means of the actuating device in relation to the support in an adjustment movement having at least one considerable radial component. In a particularly preferred manner, such an adjustment movement is realized by the plunger head gripping means being pivotally mounted on the plunger adjusting device. In this case, the radial component of the adjustment movement is modified in the course of the plunger head gripping means pivoting-in to the support.

The plunger adjusting device, therefore, does not have the plunger gripping levers, which are known from the prior art, are positioned opposite each other and are radially adjustable, but now has the plunger head gripping means and, as abutment for the adjusting movement thereof, the radially acting support on the plunger adjusting device. In an advantageous embodiment, the plunger head gripping means is realized in one piece. A radially initiated clamping force is generated in the gripping position without any further components. This is generated directly by the one plunger head gripping means. In place of a single pairing of plunger head gripping means and support, however, multiple such components can be set up, for example, grasping the plunger head radially from different sides.

According to the invention, the essential part of the plunger head gripping device has been moved into the adjustable plunger head gripping means, which, in the release position, is collision-free when the plunger head of the syringe to be coupled is inserted axially into the pipette housing and the plunger head gripping device located therein. The radially supporting support, which serves as abutment for the plunger head gripping means, is also arranged such that the plunger head of the syringe to be coupled can be inserted axially in a collision-free manner.

According to a further aspect of the invention the plunger displacing device has a stop member, which supports the plunger head of a syringe inserted into the pipette housing in a direction that differs from the supporting direction of the support in opposition to the adjustment movement of the plunger head gripping means into the release position.

The stop member supports the plunger head of the syringe inserted into the pipette housing in opposition to the adjustment movement of the plunger head gripping means into the release position. Said stop member acts, as it were, as holding-down means for the plunger head such that the plunger head gripping means can be detached from the plunger head on its path into the release position and does not lift said plunger head upwards under the effect of the friction-locking.

In a further expedient design, the plunger displacing device has an axially deflecting pressure piece. An axially aligned stopping face, which supports in an axial manner the plunger head of a syringe inserted into the pipette housing, is preferably arranged on the pressure piece. The stop member, which has the function of a holding-down means, is also arranged in an expedient manner on the pressure piece.

The achievement here is that, when the syringe is inserted, the plunger head is forcibly moved into the position in which the plunger is completely inserted into the cylinder. This structural solution is already known as such for a syringe that is to be coupled radially (see, German Patent Application DE 199 63 141 A1 and corresponding U.S. Pat. No. 6,540,964 B2), but has special significance here for coupling the syringe in an axial manner in conjunction with the plunger head gripping means. When the syringe is discarded, the spring force of the pressure piece acts in a supporting manner for the discarding process such that the syringe is safely discarded and completely removed from the pipette housing.

In an expedient manner, the pressure piece is axially pretensioned against the plunger head and consequently, without a syringe, assumes a front position and with an inserted syringe, a rear position. This too, in principle, is the function of the solutions of the prior art. Using this structural solution, it is possible for the pressure piece, in its front position, to block the plunger head gripping device such that the plunger head gripping means is then not adjustable into the gripping position. Without a syringe, therefore, the plunger head gripping means cannot be activated. This makes it possible to prevent a syringe being inserted when the plunger head gripping means is closed. Inappropriate handling of the pipette is therefore prevented.

The sequence of movement for the actuating device is optimized by a radial adjustment movement of the actuating device in relation to the plunger adjusting device, in particular when the variant with the superposed pivoting movement about a transversely extending pivot axis is selected. This adjustment movement, initially extending transversely in relation to the axial guiding of the plunger adjusting device, makes it possible, together with a connecting link guide, to use the actuating device both to drive the plunger head gripping means and to actuate the plunger displacing device and consequently the plunger of the syringe.

In the case of axial syringe coupling, it is especially necessary for the axial coupling to run as easily as possible. Feed-in inclinations which are correspondingly developed and arranged on the support and also on the stop member can serve for this purpose. This facilitates the manual assembly of pipette and syringe.

With regard to the structural development of the cylinder gripping device, according to the invention and according to a preferred teaching, the cylinder gripping device has at least two cylinder gripping levers, which are mounted so as to be pivotable in the pipette housing and are set radially under spring force towards the fastening portion of an inserted syringe, wherein each cylinder gripping lever has a driving arm, and wherein the cylinder gripping device is also adjustable between a gripping position and a release position by means of the actuating device.

In a preferred version of this construction for adjusting the plunger head gripping means from the gripping position into the release position, the actuating device carries out a pivoting movement forward, in the direction of the syringe, for adjusting the cylinder gripping device from the gripping position into the release position said pivoting movement is continued forward, and whereas the pivoting movement of the actuating device is continued, the cylinder gripping levers of the cylinder gripping device are adjusted away from the fastening portion of an inserted syringe.

According to a further aspect of the present invention, the actuating device has associated therewith a spring element, which acts in the direction of the pivoting movement for adjusting the plunger head gripping means from the gripping position into the release position, whereas the pivoting movement continues for adjusting the cylinder gripping device, the spring element is made ineffective.

According to a preferred version of the invention the actuating device, as its pivoting movement continues, drives a force transmitting train, which, by means of the driving arms, opens the cylinder gripping levers of the cylinder gripping device in a symmetrical manner.

According to a further version of the last mentioned aspect, the pipette has a cover for closing an opening in the pipette housing for the actuating device of the plunger displacing device and wherein the cover forms the force transmitting train.

In another and independent aspect of the present invention, this invention is directed to a pipette and a syringe, where the syringe has a cylinder with a fastening portion realized preferably as a flange, and a plunger with a plunger head which projects out of the end of the cylinder even when the plunger has been completely inserted into the cylinder, a pipette housing which has a longitudinal axis, wherein a syringe to be handled with the pipette is insertable with its fastening portion and plunger head into the pipette housing and is removable or discardable from said pipette housing in the direction of the longitudinal axis of the pipette housing, i.e., axially, an axially accessible opening on the pipette housing for the fastening portion of the syringe, an axially accessible cylinder gripping device, mounted fixed in position in the pipette housing, for the fastening portion of the syringe, having a plunger displacing device which is axially displaceable in the pipette housing, an axially accessible plunger gripping device for the plunger head of the syringe, said plunger gripping device being mounted on the plunger displacing device and being axially displaceable with said plunger displacing device and an actuating device for the plunger gripping device, wherein, by actuating the actuating device, the plunger gripping device is movable from a gripping position into a release position, in which the plunger head of a syringe is released for removal or picking up, wherein an additional actuating slide for actuating the cylinder gripping device is arranged on the pipette housing.

Here, there is a separate and additional actuating slide for actuating the cylinder gripping device.

In the context of the last-mentioned aspect of the invention, a preferred construction is provided wherein the cylinder gripping device has at least two cylinder gripping levers, which are mounted so as to be pivotable in the pipette housing and are set radially under spring force towards the fastening portion of an inserted syringe, wherein each cylinder gripping lever has a driving arm, and wherein the cylinder gripping device is also adjustable between a gripping position and a release position by means of the actuating slide.

According to a preferred version of the last-mentioned construction, the actuating slide opens the cylinder gripping levers of the cylinder gripping device in a symmetrical manner by means of the driving arms.

According to a further aspect of the present invention, the actuating device for the plunger gripping device is mounted on the plunger displacing device and is axially displaceable with said plunger adjusting device.

According to a further aspect of the present invention, the plunger gripping device is also movable out of the release position, into the gripping position by actuating the actuating device, wherein the plunger gripping device has a support, which supports the plunger head of a syringe inserted into the pipette housing radially, transversely in relation to the longitudinal axis of the pipette housing, and an adjustable plunger head gripping means, wherein by actuating the actuating device, the plunger head gripping means is adjustable from the release position, releasing the plunger head, into the gripping position, fixing the plunger head on the plunger adjusting device, and wherein by means of the actuating device, the plunger head gripping means is adjustable in relation to the support in an adjustment movement which has at least one considerable radial component, and for this purpose, preferably, is pivotably mounted on the plunger adjusting device.

According to a further aspect of the present invention, the plunger displacing device has a stop member, which supports the plunger head of a syringe inserted into the pipette housing in a direction that differs from the supporting direction of the support in opposition to the adjustment movement of the plunger head gripping means into the release position.

According to a further aspect of the present invention, the plunger displacing device has an axially deflecting pressure piece, on which is preferably arranged an axially aligned stopping face, which supports in an axial manner the plunger head of a syringe inserted into the pipette housing, and wherein the stop member is also arranged on the pressure piece.

According to a further aspect of the present invention, the pressure piece is axially pre-tensioned against the plunger head of the syringe to be axially inserted and thus assumes a front position without a syringe and a rear position with an inserted syringe, and wherein the pressure piece in its front position blocks the plunger gripping device such that the plunger head gripping means is not adjustable into the gripping position, and, in its rear position, said pressure piece releases the plunger gripping device such that the plunger head gripping means is adjustable into the gripping position.

According to a further aspect of the present invention, the support, and also the stop member, has feed-in inclinations in order to facilitate the axial insertion of the plunger head of the syringe.

According to the invention, it is possible to detach the syringe separately, on the one hand, the plunger by way of the plunger head gripping device, and on the other hand, the fastening portion of the cylinder by way of the cylinder gripping device. This also makes it possible to remove a syringe with drawn-up liquid out of the pipette in order to use it in another way or subsequently.

Finally, in principle, a dual actuating option can also be provided for the cylinder gripping device.

The invention is now explained in detail below in conjunction with the accompanying drawings representing only exemplary embodiments.

BRIEF DESCRIPTION OF THE DRAWINGS

FIG. 2b is a top view of the pipette in FIG. 2a, FIG. 3a is a cross-sectional view showing a longitudinal section, similar to FIG. 2a, of the pipette according to the invention, with the syringe inserted and plunger gripping device open, FIG. 3b shows a top view, similar to FIG. 2b, of the pipette in FIG. 3a, FIG. 4a is a cross-sectional view showing a longitudinal section, similar to FIG. 2a, of the pipette according to the invention, with plunger gripping device and cylinder gripping device open and the syringe already removed or to be inserted, FIG. 4b shows a top view, similar to FIG. 2b, of the pipette in FIG. 4a, FIG. 5a is a cross-sectional view showing a longitudinal section, at the lower end of the pipette housing, of another preferred exemplary embodiment of a pipette according to the invention with the syringe, inserted, ready for drawing in a liquid, FIG. 5b shows a top view of the pipette in FIG. 5a, FIG. 6a is a cross-sectional view showing a longitudinal section, similar to FIG. 3a, of the further exemplary embodiment with the syringe inserted and the plunger head gripping device open, FIG. 6b shows a top view, similar to FIG. 3b, of the pipette in FIG. 6a, FIG. 7a is a cross-sectional view showing a longitudinal section, similar to FIG. 4a, of the further exemplary embodiment with plunger gripping device and cylinder gripping device open and the syringe removed or to be inserted.

DETAILED DESCRIPTION OF THE INVENTION

Figure 1:
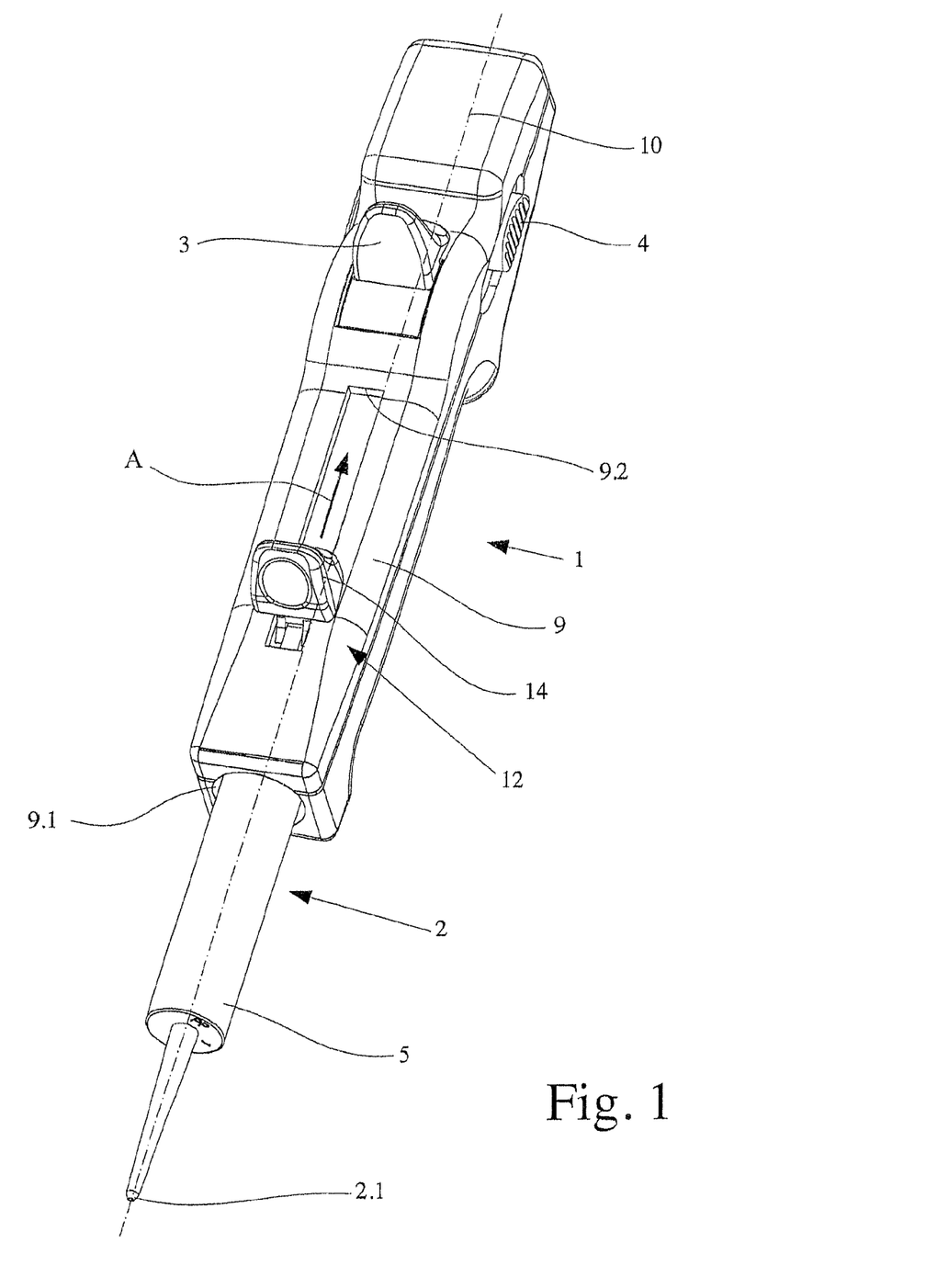
FIG. 1 is a perspective representation of a pipette according to the invention with a syringe inserted.

FIG. 1 shows the basic development of a pipette 1 according to the invention with a syringe 2 inserted. With regard to the actuation of the syringe 2, in operation, the pipette 1 is driven by means of a slidable tab 3. An adjusting device 4 allows the stroke path to be adjusted per stroke of the tab 3.

Figure 2A:
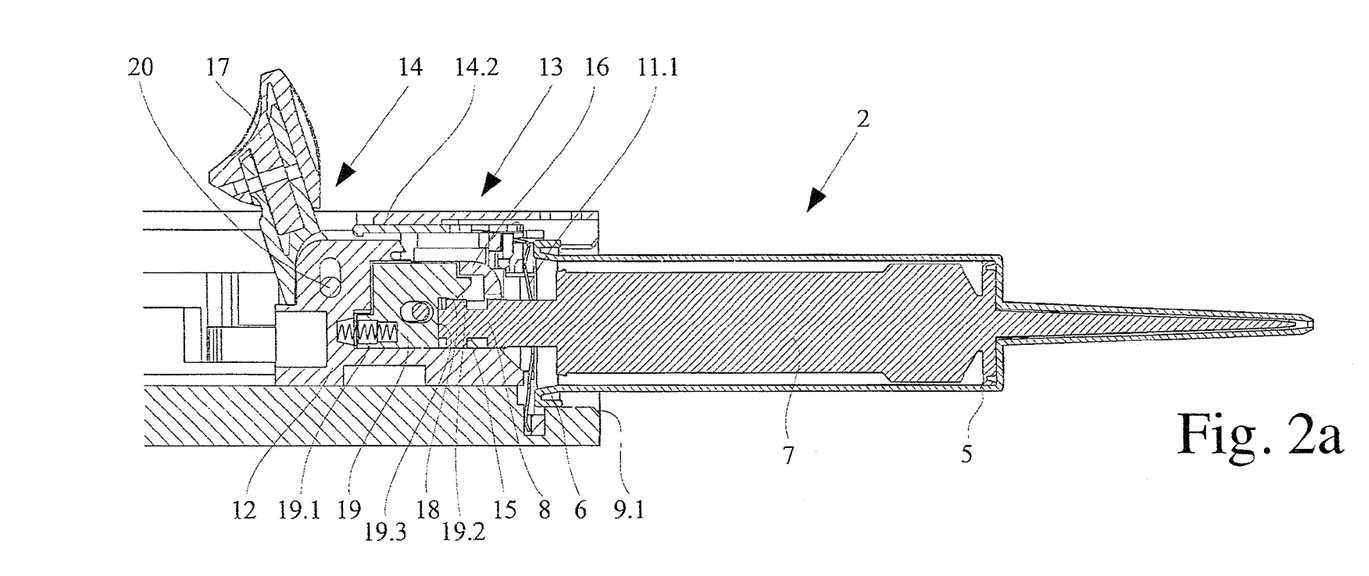
FIG. 2a is a cross-sectional view showing a longitudinal section, at the lower end of the pipette housing, of a preferred exemplary embodiment of a pipette according to the invention with a syringe inserted, ready for drawing in a liquid.

The syringe 2 is typically produced from plastics material and has a cylinder 5 with a fastening portion 6 and a plunger 7 which runs in the cylinder 5 and has a plunger head 8; see, e.g., FIG. 2a. The syringe 2 itself can be handled and replaced by itself. In the case of the pipette 1 shown in FIG. 1, the replaceable syringe 2, which is to be handled in each case by way of the pipette 1, can be inserted axially into the pipette and also removed or discarded axially from the pipette 1.

By means of the intake opening 2.1, indicated at the bottom of FIG. 1, liquid is drawn into the cylinder 5 of the syringe 2, and by actuating the tab 3, is discharged again, in multiple successive partial amounts.

The following FIGS. 2 to 7 show, in each case, the axially bottom end of the pipette 1 from FIG. 1. The present invention is concerned with the mechanism realized there. In each case, the (a) Fig. shows a longitudinal section at this position and the second (b) Fig. shows a top view at that position.

Figure 2B:
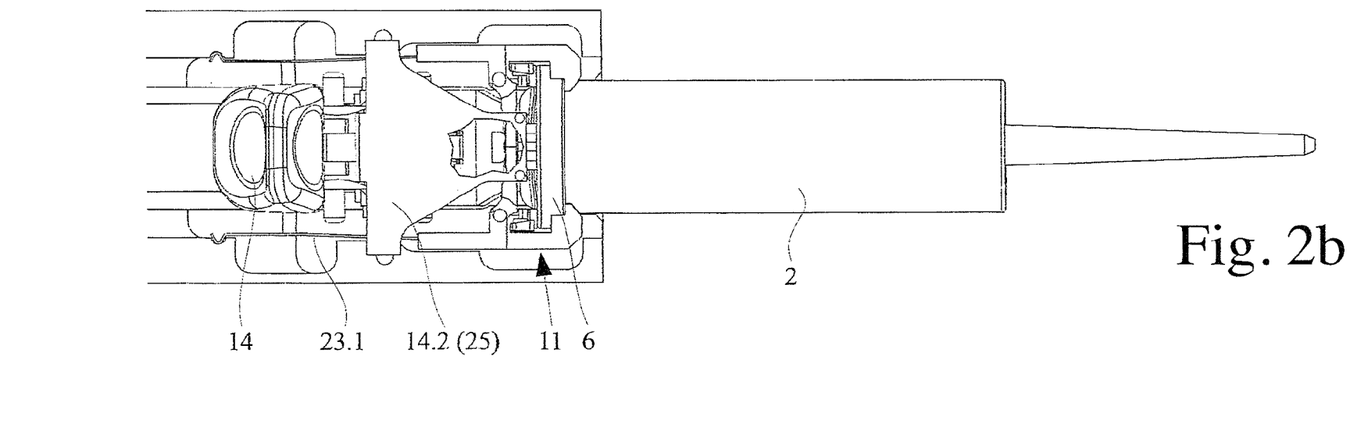
Figure 4A:
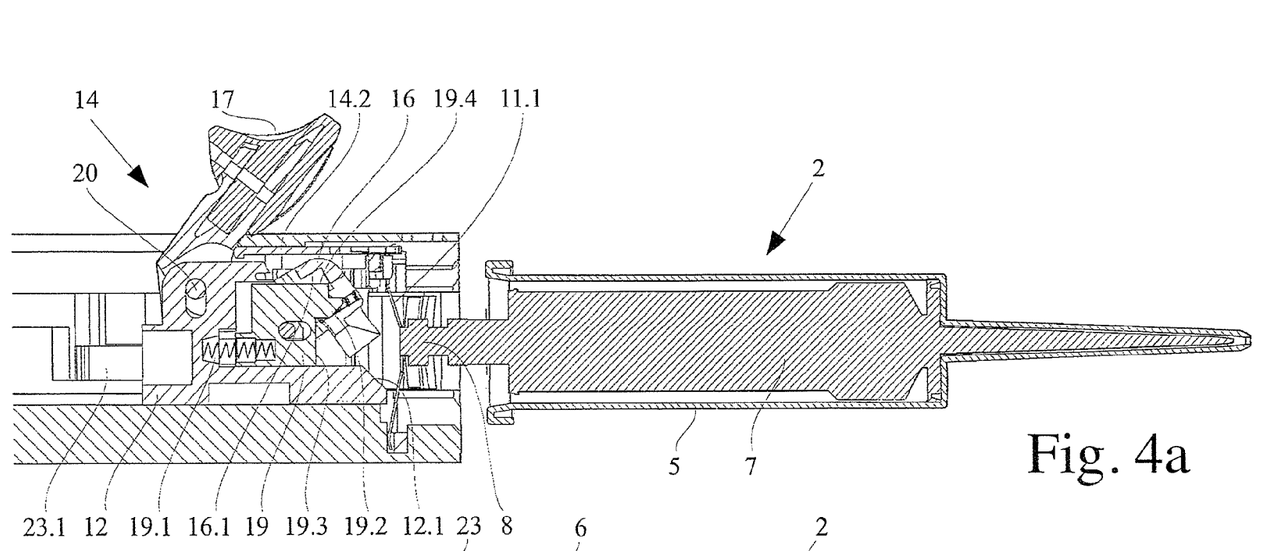

It can be seen, initially, from FIG. 1 in conjunction with FIG. 2, that the fastening portion 6 of the cylinder 5 is designed, in this case and preferably, as a ring-shaped flange. A plunger head 8, which projects out of the end of the cylinder 5 even when the plunger 7 has been completely inserted into the cylinder 5 (FIG. 2(a)), is situated on the plunger 7. This can also be seen particularly well with the syringe 2 removed, as shown in FIG. 4(a).

The pipette 1 shown in FIG. 1 has a pipette housing 9, which has a longitudinal axis 10. The syringe 2 is inserted into the pipette housing 9 at an axial opening 9.1 in that location such that it is aligned in the direction of the longitudinal axis 10. In the text below, all directional specifications relate to the longitudinal axis 10.

The term "axially" means "in the direction of the longitudinal axis 10;" however, this term also includes lines parallel to the longitudinal axis 10 itself. In order to visualize this term, FIG. 1 shows an arrow A within an axial opening 9.2 for an actuating device 14 of a plunger displacing device 12. From the position shown in FIG. 1 the actuating device 14 can move axially following arrow A or, when the actuating device 14 is in the upper position close to line 9.2, it can be moved in the opposite direction relative to arrow A.

The term "radially" means a direction transverse to the longitudinal axis 10 of the pipette housing 9 or of corresponding lines parallel to the longitudinal axis 10.

Figure 4B:
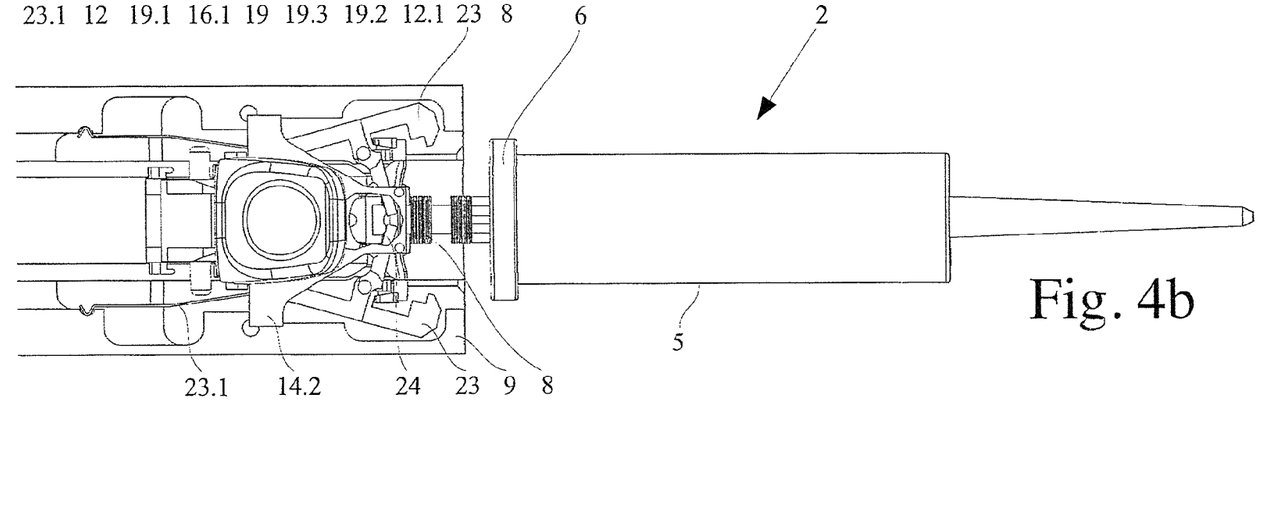

It can be seen particularly well from FIGS. 1, 2 and 4 together that syringe 2, which is to be handled by way of the pipette 1, is insertable with its fastening portion 6 and the plunger head 8 into the pipette housing 9 and is removable or discardable axially from the pipette housing, i.e., in the direction of the longitudinal axis 10 of the pipette housing 9. The genus of the present invention, therefore, is a pipette 1 with an axially couplable or discardable syringe 2. The axially accessible opening 9.1 on the pipette housing 9 can also be seen in FIG. 2a and in all the other Figs.

FIG. 2(a)-(b) show an axially accessible cylinder gripping device 11 for the fastening portion 6 of the syringe 2, said cylinder gripping device being mounted in a fixed position in the pipette housing 9. FIGS. 2(a)-(b) show how the fastening portion 6 is held with the cylinder gripping device 11.

In addition, a plunger displacing device 12 is provided so as to be axially displaceable in the pipette housing 9. The actuating of the tab 3 drives the plunger displacing device 12 to eject part amounts of liquid from the syringe 2. A plunger gripping device 13 for the plunger head 8 of the syringe 2 is mounted on the plunger displacing device 12, the plunger gripping device being axially accessible and axially displaceable with the plunger displacing device 12 in the pipette housing 9.

An actuating device 14 for the plunger gripping device 13 is situated on the plunger displacing device 12. The actuating of the actuating device 14 can move the plunger gripping device 13 from a gripping position, FIG. 2, into a release position, FIG. 3, in which the plunger head 8 of a syringe 2 can be released for removal or inserted to be gripped.

The plunger displacing device 12, in the exemplary embodiment shown, is also driven by means of the actuating device 14 for moving in the axial direction, predominantly for drawing in liquid. For this purpose, an opening 9.2 for the actuating device 14 of the plunger displacing device 12 can be seen in the pipette housing 9. For drawing liquid into the syringe 2, the actuating device 14 in FIG. 1 on the pipette housing 9 is displaced upward as far as the upper stop member formed by the end of the opening 9.2. The downward movement for discharging part amounts is then effected by actuating the key 3 in individual stages.

The essential point, now, is that the actuating device 14 for the plunger gripping device 13 is mounted on the plunger displacing device 12 and is displaceable with the plunger displacing device in an axial manner, as has already been shown in FIG. 1. Therefore, the actuating device 14 is not, as in the prior art that has already been explained, separate from the plunger displacing device 12 when working with the pipette 1. This has the advantages named in the general part of the description.

The principle teaching of the invention explained beforehand has been developed in FIGS. 2, 3 and 4 in a particular exemplary embodiment.

Figures 3A, 3B:
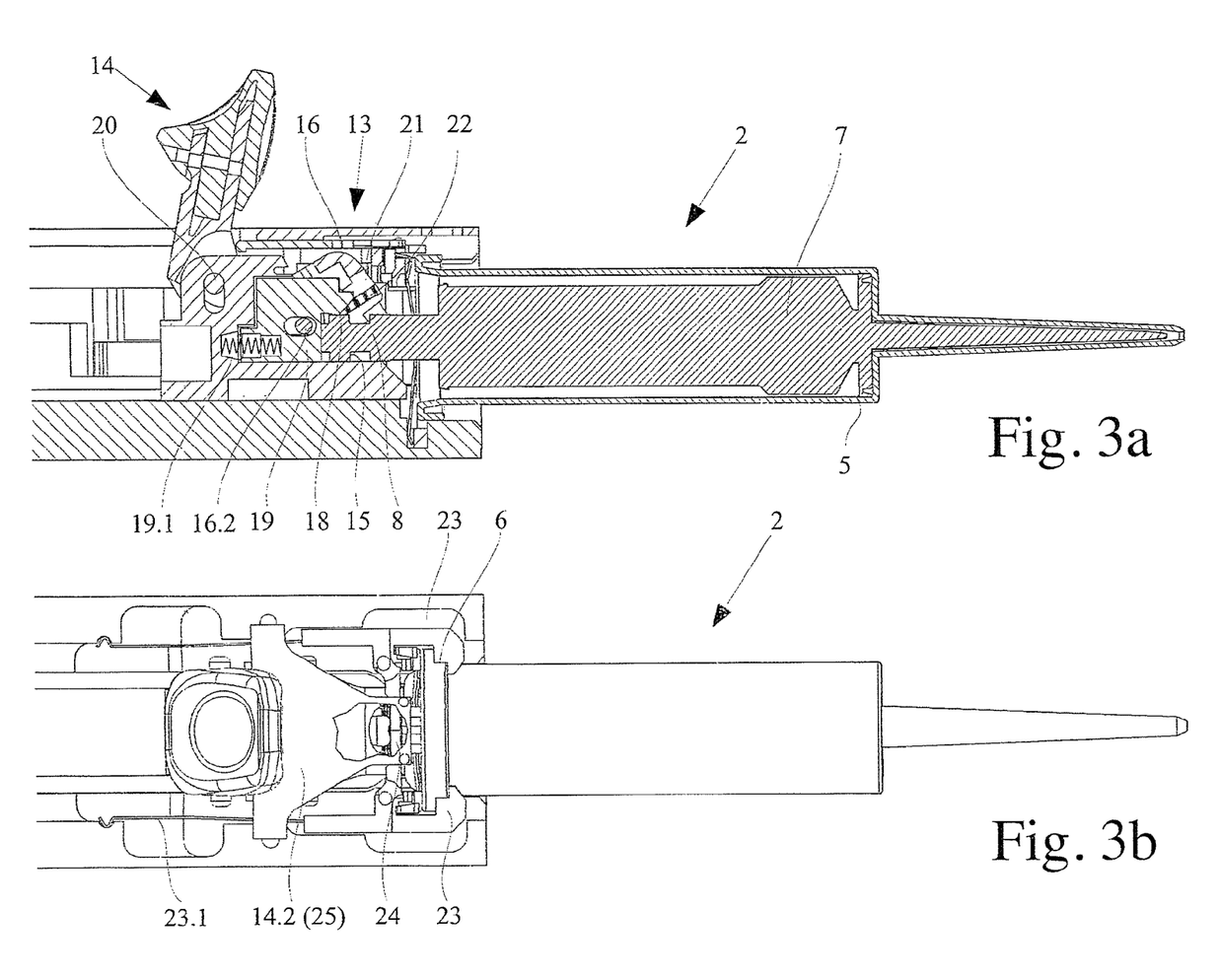

First of all, for the exemplary embodiment shown in FIGS. 2 to 4, it is true to say that, by actuating the actuating device 14, the plunger gripping device 13 is also movable from the release position into the gripping position, that the plunger gripping device 13 has a support 15 which supports the plunger head 8 of a syringe 2 inserted into the pipette housing 9 transversely in relation to the longitudinal axis 10 of the pipette housing 9, i.e., radially, and an adjustable plunger head gripping means 16, that, by actuating the actuating device 14, the plunger head gripping means 16 is adjustable from the release position, releasing the plunger head 8, into the gripping position, fixing the plunger head 8 on the plunger displacing device 12, and that, by means of the actuating device 14, the plunger head gripping means 16 is adjustable in relation to the support 15 in an adjustment movement that has at least one considerable radial component. According to a particularly preferred teaching, this adjustment movement is realized by the plunger head gripping means 16 being pivotably mounted on the plunger displacing device 12. The radial component of the adjustment movement is modified during the adjustment movement of the plunger head gripping means 16. It becomes greater and greater, the nearer the plunger head gripping means 16 comes to the support 15.

The components of the pipette 1 are shown in the gripping position in FIG. 2, at the top in the longitudinal section in FIG. 2a and at the bottom in the top view in FIG. 2b. By means of the actuating device 14, the plunger head gripping means 16 has been adjusted downward into the gripping position, in the adjustment movement that has a considerable radial component, in relation to the support 15. In order to be able to exert the force, the actuating device 14 is provided with a sturdy actuating lever 17.

FIG. 3 shows the open plunger head gripping means 16 situated in the release position. To this end, from FIG. 2 to FIG. 3, the actuating device 14 has been pivoted to the right in the plane shown in FIG. 3a. It can be seen that the plunger head gripping means 16 has been raised in FIG. 3a in relation to FIG. 2a. At the same time, the plunger head gripping means 16 was pivoted about an axis 16.2 at the plunger displacing device 12. The plunger head 8 has now been released and could, if desired, be pulled to the right out of the pipette housing 9.

In this case, the shown and preferred exemplary embodiment, has the plunger head gripping means 16 realized in one piece, as it were in the form of a U-shaped body. In principle, however, the plunger head gripping means 16 could also be composed of a plurality of component parts.

A comparison between FIG. 2a and FIG. 3a also shows that, in this exemplary embodiment, the plunger displacing device 12 has a stop member 18, which supports the plunger head of a syringe 2 inserted into the pipette housing 9 in a direction that differs from the supporting direction of the support 15, preferably radially, in opposition to the adjustment movement of the plunger head gripping means 16 into the release position. FIG. 3a shows that, by means of the stop member 18 on the plunger displacing device 12, the plunger head 8 is held at the bottom on the support 15, although the plunger head gripping means 16 has been removed upward. The stop member 18, therefore, acts as a type of holding-down means.

FIGS. 2 & 3 also show that the plunger displacing device 12, as is known per se from the prior art, has an axially deflecting pressure piece 19. This axially deflecting pressure piece 19 is pretensioned to the right by a compression spring 19.1 in FIGS. 2 & 3 such that, with the syringe 2 inserted, the plunger 7 has been securely advanced as far as the bottom of the cylinder 5.

A feed-in inclination 19.2 is situated on the pressure piece 19. According to a preferred teaching, an axially aligned stopping face 19.3, which supports in an axial manner the plunger head 8 of a syringe 2 inserted into the pipette housing 9 and thus fulfills the aforedescribed advancing function, is also situated on the pressure piece 19.

According to a preferred teaching of the invention, the stop member 18 is also arranged on the pressure piece 19. The pressure piece 19, therefore, combines the axial advancing function with the holding-down function for the plunger head 8.

A comparison between FIGS. 3a and 4a makes it clear that the pressure piece 19 is axially pretensioned by means of the compression spring 19.1 against the plunger head 8 of the syringe 2, which is to be inserted axially, and thus assumes a front position without a syringe 2 (FIG. 4a) and a rear position, lying deeper in the pipette housing 9, with a syringe 2 inserted (FIGS. 2a, 3a).

The entire structure with the axially spring-loaded pressure piece 19 ensures that the plunger 7 is always pushed completely into the cylinder 5. When liquid is sucked up into the syringe 2, the remaining quantity of air is thus as small as possible.

The axial displacement movement of the pressure piece 19 under the effect of the compression spring 19.1 can be utilized to control the plunger gripping device 13. According to the teaching of the invention that is preferred and shown here, it is provided to this end that, in its front position, the pressure piece 19 blocks the plunger gripping device 13 such that the plunger head gripping means 16 is not adjustable into the gripping position, and in the rear position releases the plunger head gripping device 13 such that the plunger head gripping means 16 is adjustable into the gripping position.

In the position shown in FIG. 4a, the plunger head gripping means 16 cannot be pivoted downward and obtain the gripping position, as can be seen clearly in FIG. 4a by way of the position of the edges. In contrast, this is easily possible with the transition of FIG. 3a to FIG. 2a. This is made obvious by the fact that in FIG. 4, if the plunger head gripping means 16 were to be pivoted down, the face 16.1 on the plunger head gripping means 16 would collide with the top side 19.4 of the pressure piece 19. In contrast, this would not be the case in the transition from FIG. 3 to FIG. 2.

In the exemplary embodiment in FIGS. 2 to 4 and 8, it is noticed that the actuating device 14 is mounted in such a manner on the plunger displacing device 12 that it is radially displaceable for the adjustment of the plunger head gripping means 16 from the gripping position into the release position, and as an additional option, it is pivotable about a pivot axis 20 that extends both transversely in relation to the longitudinal axis 10 and transversely in relation to the direction of displacement.

The actuating device 14, or the actuating lever 17 of the actuating device 14, is pivotable about the pivot axis 20 that extends both transversely in relation to the longitudinal axis and transversely in relation to the direction of displacement. It is understood that the pivot axis 20 is radially displaceable or adjustable. This is seen when comparing FIG. 2a to FIG. 3a and FIG. 4a. The pivot axis 20 is loosely adjusted from bottom to top in the elongated hole of the plunger gripping device 12. In this case, this is a superposed displacement movement and pivoting movement about the pivot axis 20.

The prior art already provides a plunger head gripping means with cutting edge-like profilings in order to be able to grasp the plunger head of a syringe in an effectively secure manner so as to transmit force axially. This structural development of the prior art can also be applied to the plunger head gripping means 16 of the teaching of the invention described here. It can be seen from FIGS. 3 & 4 that laterally arranged clamping jaws 21 are provided on the plunger head gripping means 16, said clamping jaws preferably being able to transmit considerable tensile forces from the plunger displacing device 12 onto the plunger in an axial manner and in a laterally clamping manner.

In the exemplary embodiment that is shown and is preferred, it can be seen that the clamping jaws 21 are provided with profilings 22 (FIG. 3a), in particular with cutting edge-like profilings, which hold the plunger head 8 in a form-fitting manner and/or force-fitting manner. The cutting edge-like profilings can be realized in the form of cutting rollers. It is also possible to combine cutting edge-like profilings on one side with cutting rollers on the other side.

The profilings 22, when viewed in the gripping position, are arranged such that they lie unequally with respect to the center line of the plunger head 8 of the syringe 2. They are, therefore, arranged extending in a somewhat inclined manner, to some extent in a skewed manner and, where applicable, also offset in relation to the longitudinal axis 10. The actuating force for the plunger head gripping means 16 is thus smaller than if the profiling 22 were arranged precisely in the direction of the longitudinal axis 10 in the gripping position.

Proceeding from FIG. 3a, the plunger head gripping means 16 is moved from that point by a pivoting of the actuating device 14 or of the actuating lever 17 to the left from the release position shown in FIG. 3a into the gripping position, shown in FIG. 2a. This force transmission is effected by means of a link mechanism (not shown). In this case, the plunger head gripping means 16, with its laterally arranged clamping jaws 21 with the profilings 22, is pivoted in the direction of the radially supporting support 15 using a large amount of force with a considerable radial movement component. The plunger head 8, in this case, is supported on the support 15 in an immobile manner as on an abutment. The clamping jaws 21 grasp the plunger head 8 in the gripping position such that the plunger head is fixed in the axial direction with reference to the plunger displacing device 12 and thus the plunger 7 is able to be displaced in the cylinder 5 by adjusting the plunger displacing device 12.

In the gripping position, the plunger head gripping means 16 generates the clamping force on the plunger head 8 by way of, in this exemplary embodiment, its U-shaped body and the laterally arranged clamping jaws 21 without any link mechanism or spring support means named from the prior art. In the exemplary embodiment that is shown and is preferred, the plunger head gripping means 16 is realized in one piece. In principle, it would also be possible to design the plunger head gripping means 16 in a plurality of parts.

The profilings 22 on the clamping jaws 21 can be formed directly on the material of the plunger head gripping means 16. An alternative would be to have separate cutting rollers as profilings 22. Such cutting rollers can be produced from relatively hard material, for example, steel or hard plastics material and then are inserted into the clamping jaws 21.

Independent stabilization of the structure in the gripping position is produced by the profilings 22 lying below a center line of the plunger head 8 of the syringe 2 when the plunger head gripping means 16 is situated in the gripping position.

Reference has already been made previously to the fact that the pressure piece 19 has a feed-in inclination 19.2 in order to facilitate the axial insertion of the plunger head 8 of the syringe 2. A corresponding feed-in inclination 12.1 can also be provided on the support 15, which is realized on the plunger displacing device 12. This has been identified in FIG. 4a. Feed-in inclinations are also integrally formed on the clamping jaws 21 of the plunger head gripping means 16.

From the top views in FIGS. 3b & 4b, it can also be seen that, in the exemplary embodiment that is shown and preferred, the cylinder gripping device 11 has two cylinder gripping levers 23, which are mounted in the pipette housing 9 and are set under spring force radially towards the fastening portion 6 of an inserted syringe 2 and that, in this case and preferably, each cylinder gripping lever 23 has a driving arm 24.

FIGS. 2b & 3b show the leaf spring 23.1, which is associated with each of the cylinder gripping levers 23, in a relatively relaxed state. In contrast, the corresponding leaf spring 23.1 in FIG. 4b is tensioned in a stronger manner on account of the pivoting of the cylinder gripping lever 23 into the release position. When the influence of the cylinder gripping levers 23 lapses by means of the actuating device 14 in FIG. 4, the cylinder gripping levers 23 return back again into their initial position in FIGS. 2b & 3b under the effect of the leaf springs 23.1.

FIGS. 2-4 make clear in their sequence that the actuating device 14 or the actuating levers thereof 17 carry out a pivoting movement forward, i.e., in the direction of the syringe 2, for moving the plunger head gripping means 16 from the gripping position into the release position, and that this pivoting movement is continued forward for moving the cylinder gripping device 11 from the gripping position into the release position. The continuing of the pivoting movement can be seen in the transition from FIG. 3a to FIG. 4a. This sequence of movement corresponds to an intuitively expedient movement of the actuating device 14.

In the transition from FIG. 3 to FIG. 4, the consequence of the movement of the actuating device 14 on the cylinder gripping levers 23 can also be understood. It is provided here namely that, as the pivoting movement of the actuating device 14 continues, the cylinder gripping levers 23 of the cylinder gripping device 11 are moved away from the fastening portion 6 of an inserted syringe 2. This is understood in the transition from FIG. 3b to FIG. 4b by way of the widened position of the cylinder gripping levers 23.

Figure 8A:
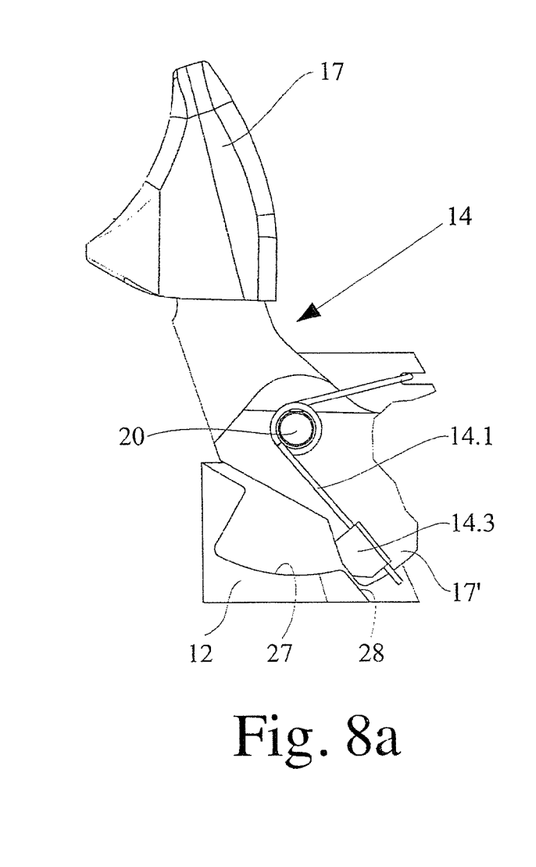
Figure 8B:
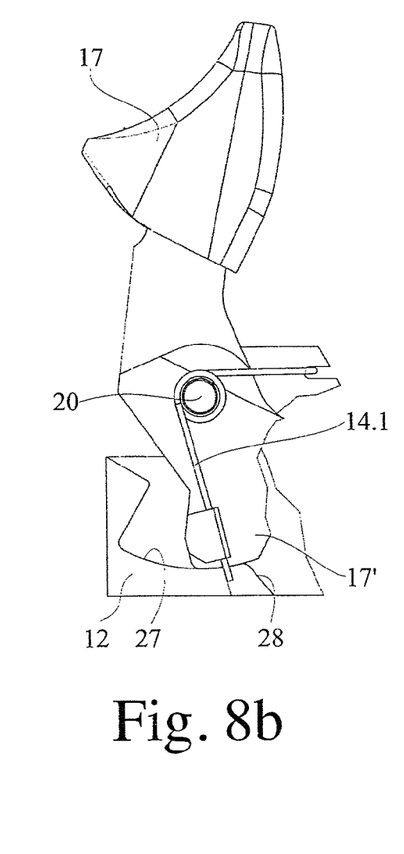
Figure 8C:
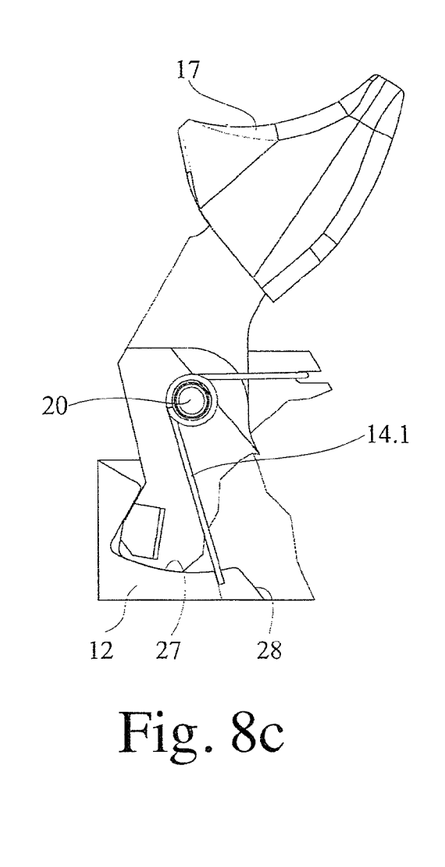

For the sequence of movement of the actuating device 14 or of the actuating lever 17 thereof reference is made to FIG. 8, which in this case shows an enlarged representation. This is one possibility of realizing such a structure.

It is understood in FIG. 8 that a connecting link 27 with a run-on inclination 28 is situated on the plunger displacing device 12. The actuating lever 17 rests with its lower arm 17' on the run-on inclination 28 normally under the spring force of a spring element 14.1. The spring element 14.1, a torsion spring, by way of its horizontal, self-supporting portion, presses the pivot axis 20 and the actuating lever 17 downward. This means that a defined position of the actuating lever 17 of the actuating device 14 is predetermined (FIG. 8a). The spring element 14.1 acts in the direction of the pivoting movement for adjusting the plunger head gripping means 16 from the gripping position into the release position.

The position shown in FIG. 8a is steady and in normal operation is not left by the actuating device 14. When the actuating lever 17 is pivoted to the right in FIG. 8a, clockwise, the lower arm 17' of the actuating lever 17 presses onto the run-on inclination 28 and pushes the entire actuating lever 17, together with its pivot axis 20, upward (deflecting radially) in opposition to the spring force of the spring element 14.1. This is seen in the transition from FIG. 8a to FIG. 8b. The lower arm 17' of the actuating lever 17 runs in the connecting link 27 of the plunger displacing device 12.

FIG. 8b shows that in this position, that is to say the position of the actuating device 14 corresponding to FIG. 3, the spring element 14.1 strikes against an elevated stopping surface below the connecting link 27. If the actuating lever 17 of the actuating device 14 is then pivoted further clockwise, that is to say in the direction of the position in FIG. 8c, the position of the pivot axis 20 is no longer modified radially (determined by the elongated hole of the plunger displacing device 12, represented in FIGS. 2 to 4). However, the actuating device 14 does pivot further, now by way of spring element 14.1 neutralized for the pivoting movement. Therefore, the spring element 14.1 is ineffective for adjusting the cylinder gripping device 11 to such an extent that only the frictional force between the lower arm 17' and the connecting link 27 is still active.

It has been shown by way of FIGS. 2 to 4 and 8 how the actuating device 14 actuates the plunger head gripping means 16. For the actuation of the cylinder gripping device 11, the exemplary embodiment in FIGS. 2 to 4 shows further that the actuating device 14, with its continued pivoting movement, drives a force transmission train 14.2 which, by means of the driving arms 24, opens the cylinder gripping levers 23 of the cylinder gripping device 11 in a symmetrical manner. This operation is seen in the transition from FIG. 3 to FIG. 4. The force transmission train 14.2 has moved a little to the right there and thus opened the cylinder, gripping levers 23 in a symmetrical manner (FIG. 4b).

FIG. 4 shows the syringe 2 moved away from the pipette housing 9 to the right in order to indicate that, in this position, it is possible to separate the syringe 2 from the pipette housing 9 or to insert it axially into said pipette housing.

FIG. 1 in conjunction with FIGS. 2 to 4 also makes it clear that, in this case, it is provided that the pipette 1 has a cover 25 for closing an opening 9.2 in the pipette housing 9 for the actuating device 14 of the plunger displacing device 12 and that the cover 25 forms the force transmission drive 14.2. This can be seen in particular marked at the bottom in FIG. 2b.

Figures 5A, 5B:
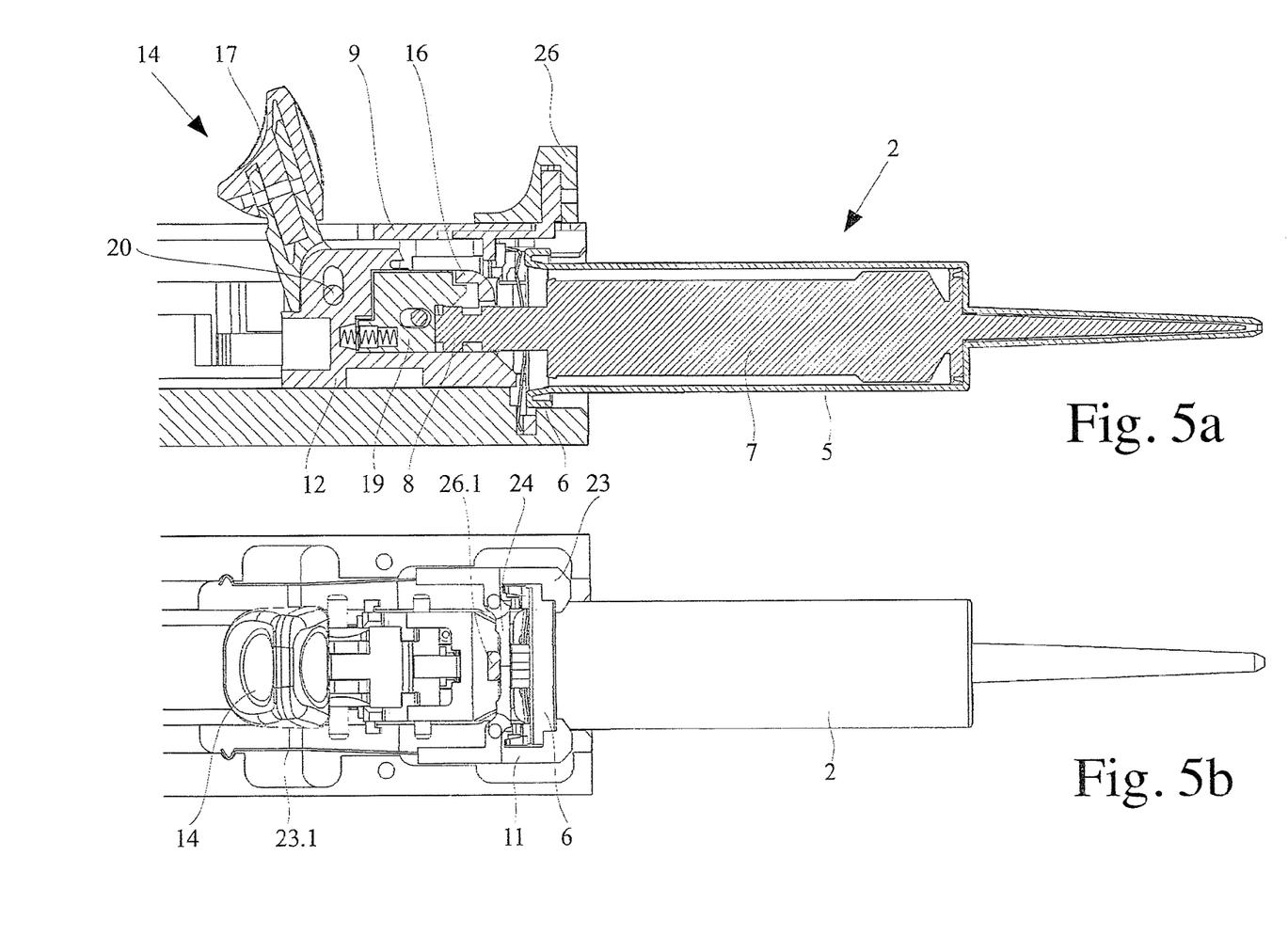
Figure 6A:
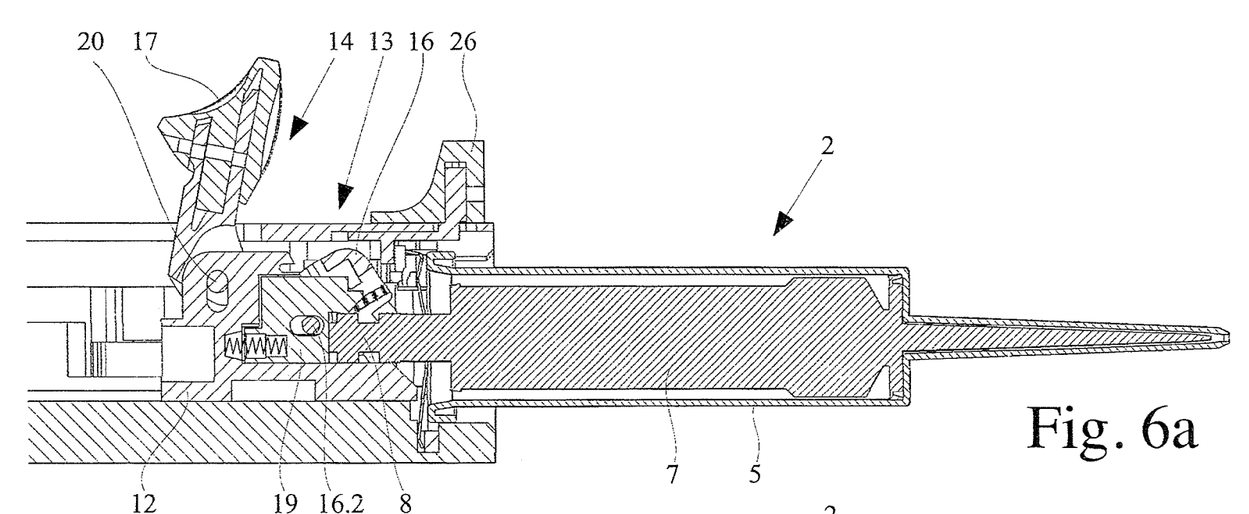
Figure 6B:
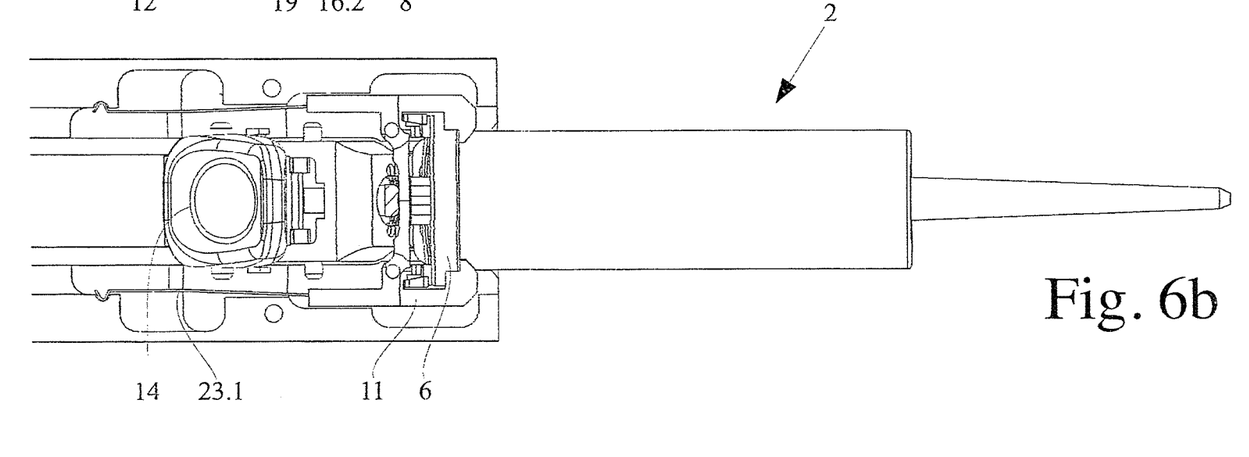
Figure 7A:
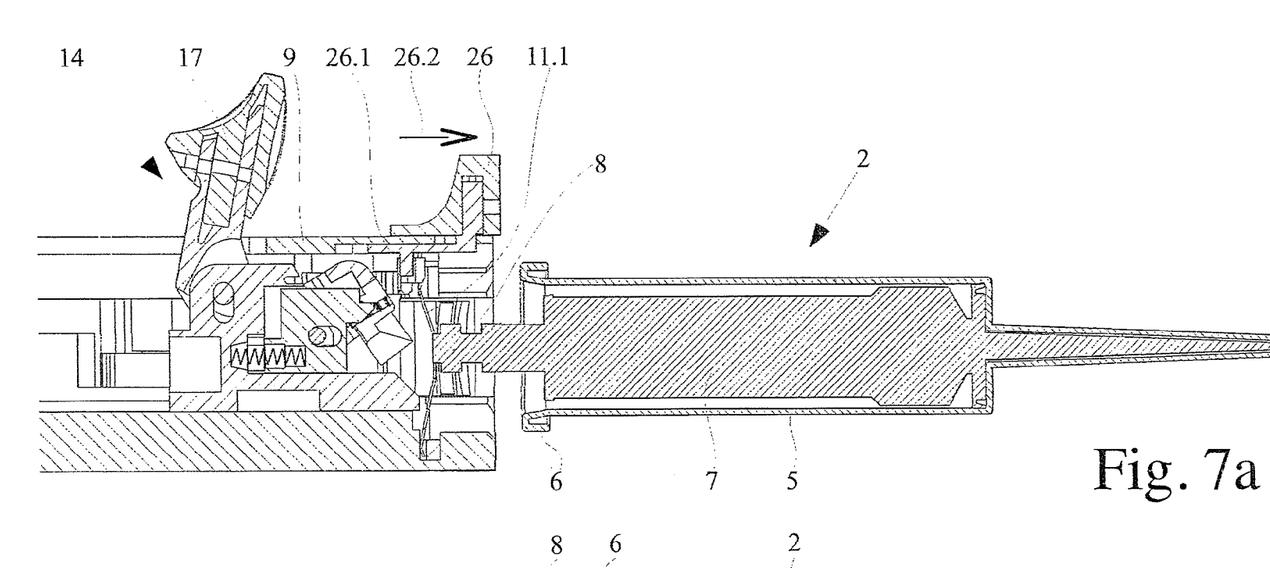
Figure 7B:
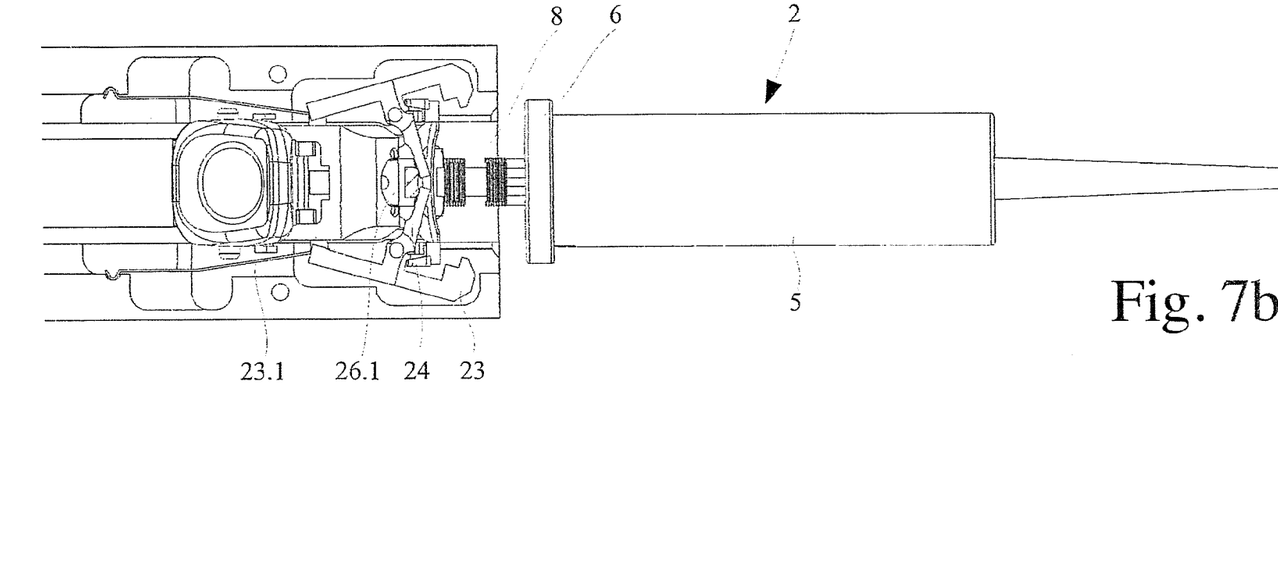
FIG. 7b shows a top view, similar to FIG. 4b, of the pipette in FIG. 7a, FIGS. 8a-8c show detailed views of a preferred exemplary embodiment of the actuating device of a pipette according to the invention.

FIGS. 5-7 show in a corresponding representation how a second, equally expedient exemplary embodiment of the teaching of the invention relates to the first exemplary embodiment in FIGS. 2, 3 and 4. In the further exemplary embodiment that is shown in FIGS. 5 to 7, it is provided that an additional actuating slide 26 for actuating the cylinder gripping device 11 is arranged on the pipette housing 9. According to this particularly preferred teaching, it is provided, in this case, that the actuating slide 26, by means of the driving arms 24, opens the cylinder gripping levers 23 of the cylinder gripping device 11 in a symmetrical manner.

The plunger head gripping means 16 is controlled by the actuating lever 17 of the actuating device 14. The sequence here is, as for the first exemplary embodiment, when the transition from FIG. 5 to FIG. 6 is looked at. Reference can be made to the designs for the exemplary embodiment in FIGS. 2 & 3 in this respect.

The other control technique for the cylinder gripping levers 23 of the cylinder gripping device can be seen, however, in the transition from FIG. 6 to FIG. 7. This is now taken over by the additional actuating slide 26, the actuating device 14 has no additional function in this regard. A projection 26.1 is situated on the actuating slide 26, said projection engaging on the driving arms 24 of the cylinder gripping levers 23 and pressing them in the direction of the syringe 2 such that the cylinder gripping levers 23 open and release the fastening portion 6 of the syringe 2. The arrow 26.2 in FIG. 7a signifies the direction of actuation for said actuating function.

Not shown in the drawing is a variant where the two actuating options for the cylinder gripping device 11 of the two exemplary embodiments in FIG. 2 to FIG. 4, on the one hand, and FIG. 5 to FIG. 7, on the other hand, are combined together. However, this is also structurally possible.

What is claimed is:

1. A pipette system, comprising:
a pipette housing with a longitudinal axis,
an axially accessible opening on the pipette housing into which, in use, a syringe is insertable into the pipette housing and is removable from said pipette housing in a respective direction parallel to the longitudinal axis of the pipette housing,
an axially accessible cylinder gripping device, mounted in a fixed position in the pipette housing, for fastening a portion of the syringe in use,
a plunger displacing device which is axially displaceable in the pipette housing,
an axially accessible plunger gripping device for gripping of a plunger head of a syringe in use, said plunger gripping device being mounted on the plunger displacing device and being axially displaceable with said plunger displacing device, and
an actuating device for the plunger gripping device,
wherein, by actuating the actuating device, the plunger gripping device is movable from a gripping position into a release position for removal or picking up of a syringe in use, and
wherein the actuating device for the plunger gripping device is mounted on the plunger displacing device and is axially displaceable with said plunger displacing device.

2. Pipette according to claim 1, wherein the plunger gripping device is also movable out of the release position into the gripping position by actuating the actuating device, wherein the plunger gripping device has a support which radially supports the plunger head of a syringe inserted into the pipette housing, transversely in relation to the longitudinal axis of the pipette housing, and has an adjustable plunger head gripping means, wherein by actuating the actuating device, the plunger head gripping means is movable from the release position, into the gripping position for fixing, in use, the plunger head on the plunger displacing device, and wherein, by means of the actuating device, the plunger head gripping means is movable in relation to the support in an adjustment movement which has at least a radial component, and for this purpose, is pivotably mounted on the plunger displacing device.

3. Pipette according to claim 2, wherein the plunger displacing device has a stop member which, in use, is adapted for supporting the plunger head of a syringe inserted into the pipette housing in a direction that differs from the supporting direction of the support and is in opposition to the movement of the plunger head gripping means into the release position.

4. Pipette according to claim 3, wherein the plunger displacing device has an axially deflecting pressure piece, on which is arranged an axially aligned stopping face which, in use, is adapted to support the plunger head of a syringe inserted into the pipette housing in an axial manner, and wherein the stop member is also arranged on the pressure piece.

5. Pipette according to claim 4, wherein the pressure piece is adapted to be axially pre-tensioned against the plunger head of a syringe, the pressure piece, in use, assuming a front position without a syringe and a rear position with an inserted syringe, and wherein the pressure piece blocks the plunger gripping device in its front position such that the plunger head gripping means is not movable into the gripping position, and in its rear position, said pressure piece releases the plunger gripping device such that the plunger head gripping means is movable into the gripping position.

6. Pipette according to claim 3, wherein the support, and also the stop member, have feed-in inclinations in order to facilitate e axial insertion of a syringe.

7. Pipette according to claim 2, wherein the cylinder gripping device has at least two cylinder gripping levers, which are mounted so as to be pivotable in the pipette housing and are set radially inward under spring force, wherein each cylinder gripping lever has a driving arm, and wherein the cylinder gripping device is also movable between a gripping position and a release position by means of the actuating device.

8. Pipette according to claim 7, wherein, for moving the plunger head gripping means from the gripping position into the release position, the actuating device is constructed so as to carry out a forward pivoting movement for moving the cylinder gripping device from the gripping position into the release position, and wherein continuation of the pivoting movement of the actuating device moves the cylinder gripping levers of the cylinder gripping device in a direction which, in use, is away from an inserted syringe.

9. Pipette according to claim 7, wherein the actuating device has associated therewith a spring element which acts in the direction of the pivoting movement for moving the plunger head gripping means from the gripping position into the release position, and wherein the spring element is rendered ineffective by continued pivoting movement for moving the cylinder gripping device.

10. Pipette according to claim 7, further comprising a force transmitting drive, wherein the actuating device is operative for driving the force transmitting drive which, by means of driving arms, opens the cylinder gripping levers of the cylinder gripping device in a symmetrical manner.

11. Pipette according to claim 10, wherein the pipette has a cover for closing an opening in the pipette housing for the actuating device and wherein the force transmitting drive is part of the cover.

12. Pipette for a pipette system, comprising:
a pipette housing with a longitudinal axis,
an axially accessible opening on the pipette housing through which a syringe is insertable into the pipette housing and is removable from said pipette housing in a respective direction parallel to the longitudinal axis of the pipette housing,
an axially accessible cylinder gripping device, mounted in a fixed position in the pipette housing, for securing of a syringe,
a plunger displacing device which is axially displaceable in the pipette housing,
an axially accessible plunger gripping device for gripping, in use, a plunger head of a syringe, said plunger gripping device being mounted on the plunger displacing device and being axially displaceable with said plunger displacing device, and
an actuating device for the plunger gripping device, wherein, by actuating the actuating device, the plunger gripping device is movable from a gripping position into a release position for removal or picking up of a syringe, in use,
wherein the actuating device for the plunger gripping device is mounted on the plunger displacing device and is axially displaceable with said plunger displacing device and
wherein an additional actuating slide for actuating the cylinder gripping device is arranged on the pipette housing.

13. Pipette according to claim 12, wherein the cylinder gripping device has at least two cylinder gripping levers which are mounted so as to be pivotable in the pipette housing and are set radially under spring force towards the fastening portion of an inserted syringe, wherein each cylinder gripping lever has a driving arm, and wherein the cylinder gripping device is also movable between a gripping position and a release position by means of the actuating slide.

14. Pipette according to claim 13, wherein the actuating slide is operative for opening the cylinder gripping levers of the cylinder gripping device in a symmetrical manner by means of the driving arms.

15. Pipette according to claim 13, wherein the actuating device for the plunger gripping device is mounted on the plunger displacing device and is axially displaceable with said plunger displacing device.

16. Pipette according to claim 15, wherein the plunger gripping device is also movable out of the release position into the gripping position by actuating the actuating device,
wherein the plunger gripping device has a support which radially supports the plunger head of a syringe inserted into the pipette housing, transversely in relation to the longitudinal axis of the pipette housing, and an adjustable plunger head gripping means,
wherein actuation of the actuating device is adapted for moving the plunger head gripping means from the release position, releasing the plunger head, into the gripping position, fixing the plunger head on the plunger displacing device, and
wherein the actuating device is adapted for moving the plunger head gripping means in relation to the support in a manner having at least a radial component, and for this purpose, is pivotably mounted on the plunger displacing device.

17. Pipette according to claim 16, wherein the plunger displacing device has a stop member which supports, in use, the plunger head of a syringe inserted into the pipette housing in a direction that differs from the supporting direction of the support and in opposition to the movement of the plunger head gripping means into the release position.

18. Pipette according to claim 17, wherein the plunger displacing device has an axially deflecting pressure piece, on which is arranged an axially aligned stopping face which axially supports, in use, the plunger head of a syringe inserted into the pipette housing, and wherein the stop member is also arranged on the pressure piece.

19. Pipette according to claim 18, wherein the pressure piece is adapted to be axially pre-tensioned, in use, against the plunger head of the syringe to be axially inserted, assumes a front position without a syringe and a rear position with an inserted syringe, and wherein the pressure piece blocks the plunger gripping device in the front position such that the plunger head gripping means is not movable into the gripping position, and in its rear position, said pressure piece releases the plunger gripping device such that the plunger head gripping means is movable into the gripping position.

20. Pipette according to claim 17, wherein the support, and also the stop member, have feed-in inclinations in order to facilitate, in use, axial insertion of the plunger head of a syringe.

* * * * *